US 6,947,735 B2

(12) United States Patent
Jung et al.

(10) Patent No.: US 6,947,735 B2
(45) Date of Patent: Sep. 20, 2005

(54) METHOD FOR AVOIDING INTERFERENCES IN CELLULAR CDMA RADIO NETWORKS CAUSED BY DEFECTIVE MOBILE STATIONS

(75) Inventors: Christof Jung, Trierweiler/Sirzenich (DE); Wolfgang Kreuz, Bonn (DE)

(73) Assignee: T-Mobile Deutschland GmbH, Bonn (DE)

(*) Notice: Subject to any disclaimer, the term of this patent is extended or adjusted under 35 U.S.C. 154(b) by 113 days.

(21) Appl. No.: 10/451,690

(22) PCT Filed: Dec. 21, 2001

(86) PCT No.: PCT/DE01/04831

§ 371 (c)(1),
(2), (4) Date: Nov. 17, 2003

(87) PCT Pub. No.: WO02/51030

PCT Pub. Date: Jun. 27, 2002

(65) Prior Publication Data

US 2004/0071117 A1 Apr. 15, 2004

(30) Foreign Application Priority Data

Dec. 21, 2000 (DE) .......................................... 100 64 351

(51) Int. Cl.[7] ................................................ H04Q 7/20
(52) U.S. Cl. ....................... 455/423; 455/424; 455/425; 455/67.11; 455/67.13
(58) Field of Search ................................. 455/423–425, 455/67.11, 67.13, 67.7, 26.1, 115.1, 115.3,

(56) References Cited

U.S. PATENT DOCUMENTS

| 5,873,027 | A | | 2/1999 | Asano |
| 6,069,881 | A | | 5/2000 | Jiang |
| 6,097,947 | A | | 8/2000 | Takai |
| 6,128,507 | A | | 10/2000 | Takai |
| 6,735,447 | B1 | * | 5/2004 | Muller ..................... 455/67.11 |

FOREIGN PATENT DOCUMENTS

| EP | 0880239 | 11/1998 |
| RU | 2120182 | 10/1998 |

* cited by examiner

Primary Examiner—Marsha D. Banks-Harold
Assistant Examiner—Olivia Marsh
(74) Attorney, Agent, or Firm—Cooper & Dunham LLP

(57) ABSTRACT

The invention relates to a method for avoiding interferences in cellular CDMA radio networks caused by defective mobile stations. To this end, the radio network is provided with a monitoring unit that compares an actual receive power arriving from a mobile station with a predetermined nominal receive power and initiates predetermined follow-up actions depending on the result of this comparison. Alternatively or additionally thereto, the monitoring unit is provided with at least one counter that is capable of detecting commands for power control of the mobile station that are transmitted individually for every mobile station from the base station to the mobile station and to initiate predetermined follow-up actions depending thereon.

14 Claims, 2 Drawing Sheets

Figure 1:
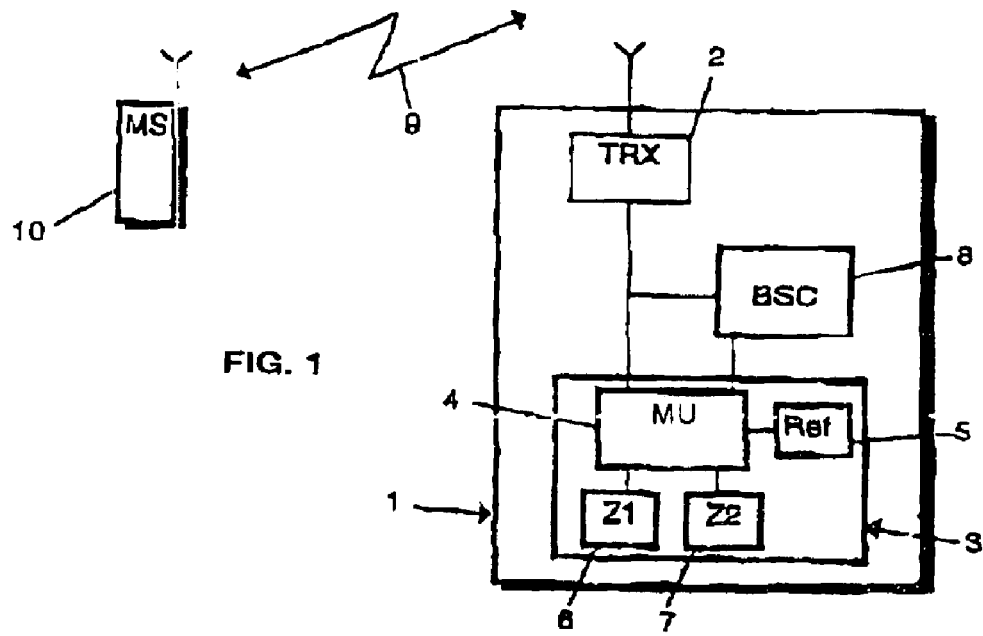

METHOD FOR AVOIDING INTERFERENCES IN CELLULAR CDMA RADIO NETWORKS CAUSED BY DEFECTIVE MOBILE STATIONS

The invention relates to methods for avoiding interference in cellular CDMA radio networks caused by defective mobile stations according to the preamble of the independent patent claims.

In recent times, cellular radio systems using so-called code division multiple access (CDMA) techniques (W-CDMA, UMTS) as multiple access methods are increasingly gaining in importance. In this multiple access technique, the same cannier frequency is normally used for all connections between a subscriber mobile station (terminal) and a base station of the radio network which must be set up via the air interface, and the subscriber is individually allocated to this carrier frequency by convolution of the baseband signal generated by the subscriber with an individual code sequence.

If signals from a number of remote stations (subscriber mobile stations) simultaneously reach a receiver of the base station, these signals are normally all at the same carrier frequency. The demodulation of a received code division signal essentially consists in the inverse convolution of the received signal by means of the code sequence used in the modulation. In this process, the signals of all other subscribers located in the relevant cell act as interference signals for the signal of the wanted subscriber to be demodulated. As a basic prerequisite for a satisfactory operation of the demodulator, all subscriber signals reaching the receiver input of the base station at the same time must have almost the same amplitude; otherwise, demodulation by inverse convolution is not possible.

In a radio cell, the path attenuation between the mobile stations and the base station depends on the distance between subscriber and base station. The normal case is differences in the path attenuations of up to 80 dB between subscribers located at the edge of the cell and the base station and, respectively, subscribers transmitting in the vicinity of the base station and the base station.

The demand for equal received field strengths at all mobile stations at the input of the base station mandatorily leads to the introduction of a corresponding control of the respective transmit power of the mobile stations. It must be possible to decrease the transmit power of mobile stations located close to the base station by up to 83 dB. The transmit power of the mobile stations is continuously monitored by the associated base station. If required; the mobile station receives from the base station via the air interface commands for power control in order to correspondingly adapt its power.

In contrast to frequency-division or time-division systems (such as FDMA-Frequency Division Multiple Access or TDMA-Time Division Multiple Access), in which each subscriber occupies a channel, the frequency or time of which is permanently defined, on the air interface and thus cannot normally adversely affect other subscribers, each subscriber acts as an interferer for all other subscribers in this cell in CDMA systems. The subscriber generating the highest received level at the base station determines the size of the radio cell in these systems. Signals from subscribers generating a lower received level at the base station will no longer be properly detected or decoded. Thus, there is a risk that, in CDMA systems, a subscriber with a terminal which has defective control of the transmit power, or none at all, blocks almost the entire radio cell by generating an extremely high received field strength at the receiver of the base station. All subscribers generating a lower received field strength at a base station in spite of maximum transmit power output are suppressed (dropped call).

It is the object of the invention to propose methods by means of which interference caused in CDMA radio networks by defective mobile stations can be avoided.

This object is achieved by the features of the independent patent claims.

According to a first embodiment of the invention, it is provided that in the radio network, a monitoring unit is provided which compares a received power arriving from a mobile station with a predetermined nominal received power and initiates predetermined follow-up actions in dependence on the result of the comparison.

As a follow-up action, the interruption of the RF link between base station and mobile station can be provided if the actual received power exceeds, preferably exceeds for a relatively long period, the nominal received power. On the other hand, it can be provided that the mobile station is completely blocked for further accesses to the radio network if the actual received power exceeds the nominal received power a number of times in succession.

The comparison is preferably in each case carried out during the first uplink connection between the mobile station and a base station of the radio network.

In a second embodiment of the invention, it is provided that in the radio network, a monitoring unit is provided in which at least one counter is set up which is capable of detecting commands for controlling the power of the mobile station, which are sent to the mobile station from the base station individually for each mobile station, and of initiating predetermined follow-up actions in dependence thereon.

In a preferred embodiment of the invention, the counter is incremented by one step with each command of the base station to the mobile station to reduce the transmit power, and is decremented by one step, or reset to zero, with each command to increase the transmit power.

As soon as the value of the counter exceeds a predetermined reference value, the base station interrupts the RF link associated with the corresponding mobile station.

Before the connection is interrupted, the subscriber can be notified about the reason for the interruption which is preferably transmitted in the form of a short SMS message.

A separate counter is set up for each existing radio link between the mobile station and the base station.

According to a further development of the invention, a second counter is implemented in the monitoring unit, by means of which the connection interruptions initiated are counted individually for each mobile station. If the value of the second counter exceeds a predetermined reference value, the access of the mobile station to the radio network is completely blocked and the subscriber is notified about the reason for the block before the mobile station is blocked. Here, too, the notification can take the form of a short message (SMS).

The block of the mobile station is advantageously linked to its international mobile equipment identity IMEI.

In both embodiments of the invention, it can be provided that the monitoring unit is set up in the base stations or in the base station controllers of the radio network.

Figure 2:
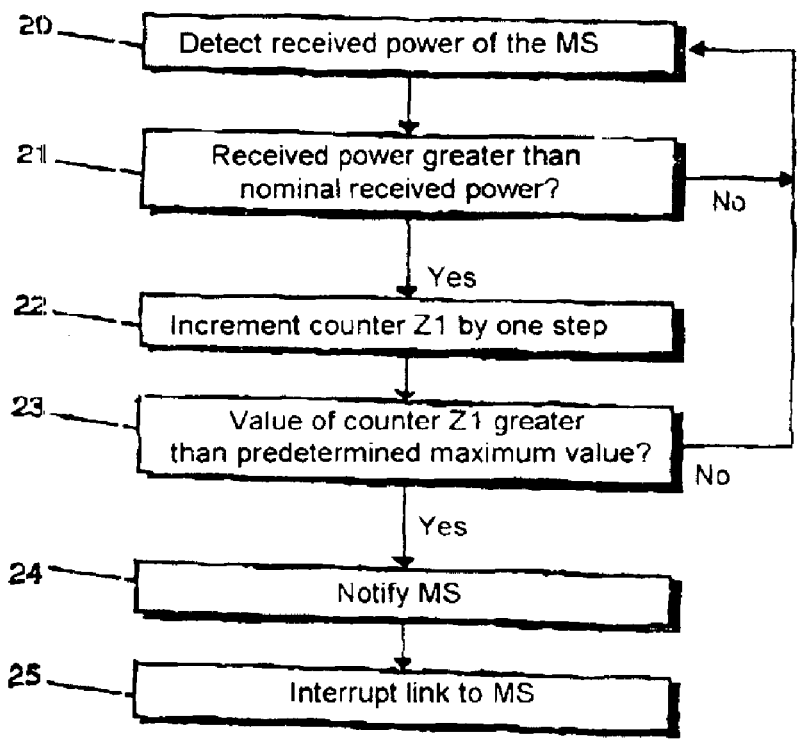
Figure 3:
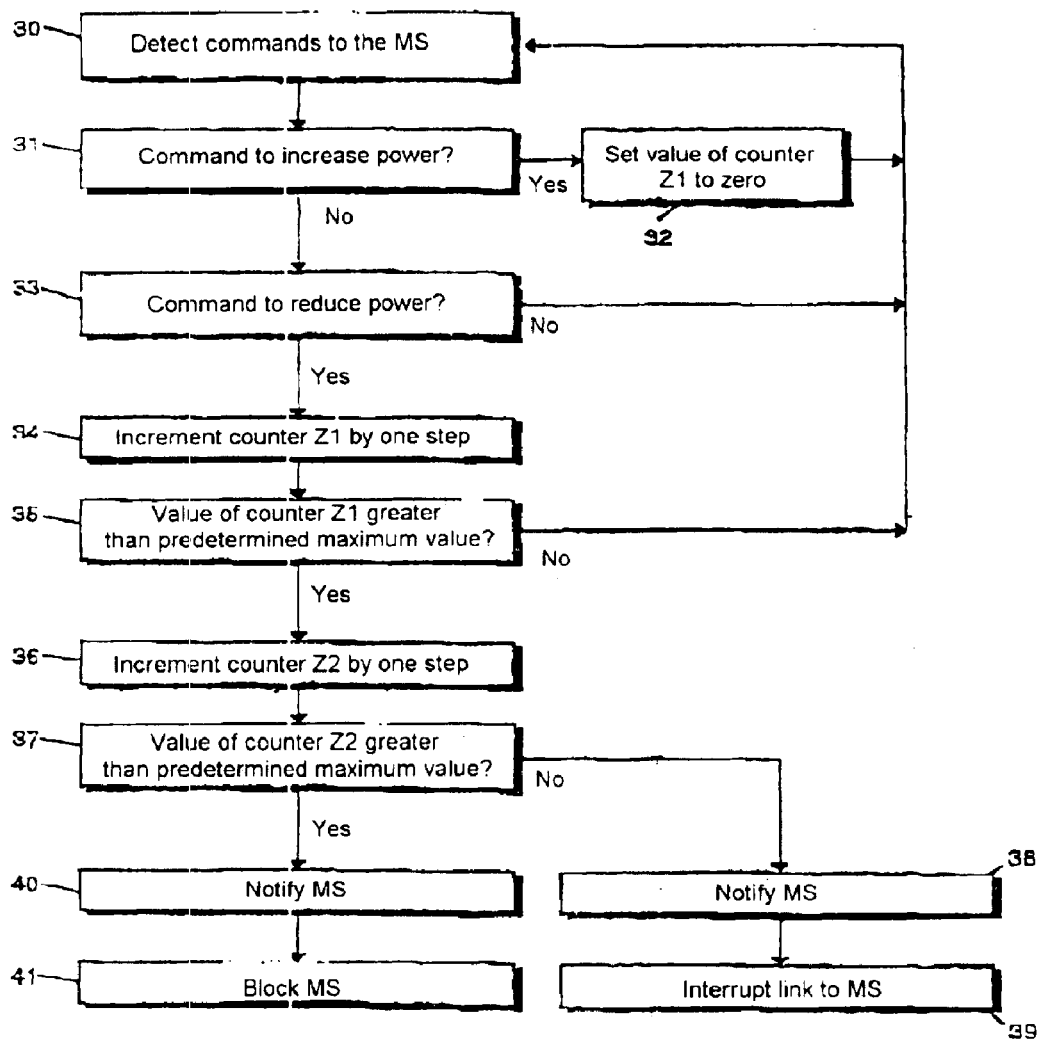

In the text which follows, exemplary embodiments of the invention are explained in greater detail with reference to drawing figures. Further features, advantages and applications of the invention are found in the description and in the drawings, in which:

FIG. 1: shows diagrammatically and in a simplified representation a possible device for carrying out the method;

FIG. 2: shows a flow chart of a first possible embodiment of the method;

FIG. 3: shows a flow chart of a second possible embodiment of the method.

In the example according to FIG. 1, the CDMA radio network considered, comprises at least one base station 1 and one mobile station 10 which can exchange radio signals with one another via an air interface 9.

The base station 1 comprises a transceiver unit 2 and is controlled by a base station controller 8 which can be arranged inside the base station 1 or also externally.

In the base station 1 (or in the base station controller 8), a monitoring unit 3 is set up which essentially comprises an evaluating logic 4, a reference value memory 5 for storing a predetermined nominal received power (reference received power) and a first and a second counter 6 and 7, respectively. The monitoring unit 3 is connected to the transceiver device 2 and to the base station controller 8 and can exchange (control) signals with these devices.

In a first embodiment of the invention, the received power of the mobile station 10 arriving at the receiver 2 of the base station 1 is evaluated in the monitoring unit 3.

Normally, the mobile station 10, when registering in the radio network, generates an uplink received level at the receiver input 2 of the base station 1 which approximately corresponds to the expected nominal input level. The reason for this behavior that the mobile station 10 monitors the pilot carrier of the base station 1 in its standby mode and sets its output power in accordance with the path attenuation assumed as a result. This type of power control is also called open loop power control.

If the power control of the mobile station 10 is defective, it may register with much too high an uplink signal level at the base station 1. If the uplink signal level for a subscriber link exceeds a nominal threshold value predetermined by the network operator several times in succession, it must be assumed that the power control of the relevant mobile station 10 is defective.

This method is illustrated in FIG. 2. The monitoring unit 3 monitors the signal level of the mobile station 10 at the input of the receiver 2 of the base station 1 (step 20). A comparison is made regularly between the input signal level received by the mobile station 10 and a predetermined nominal signal level (step 21) which is stored in the reference value memory 5. If the input signal level is less than the predetermined nominal signal level, a regular connection is set up to the mobile station 10.

If, in contrast, the input signal level is greater than the predetermined nominal signal level, the value of the counter 6 (Z1) is incremented by one step (step 22).

The value of the counter 6 is then compared with a predetermined reference value (step 23). If the value of the counter 6 is less than the reference value, the connection set-up is continued.

If, in contrast, the value of the counter 6 is greater than the predetermined reference value, the connection between mobile station 10 and base station 1 is interrupted and the mobile station is first notified about the reason for the interruption to the connection, e.g. by SMS (steps 25 and 24).

A second embodiment of the invention is described with reference to FIGS. 1 and 3. In this embodiment, the monitoring unit 3 detects the commands to the mobile station 10 for power control (step 30), coming from the base station controller 8 in an existing radio link between mobile station 10 and base station 1. The counter 6 (Z1) is used for counting and evaluating the commands to the mobile station for power control, which are sent from the base station to the mobile station.

If the monitoring unit 3 detects a command which contains a request for increasing the transmit power of the mobile station (step 31), the value of the counter 6 is reset to zero (step 32).

If the monitoring unit detects a command for decreasing power to the mobile station 10 (step 33), the value of the counter 6 is incremented by one step (step 34).

A comparison is then made as to whether the value of the counter 6 exceeds a predetermined reference value (step 35). The reference value is stored in the reference value memory 5.

If this is not so, the process continues with step 30.

If the value of the counter 6 exceeds the reference value, the value of a second counter 7 is incremented by one step (step 36). This counter 2 counts the number of reference value transgressions of the first counter 6 which is equivalent to the connection interruptions which have previously occurred for the relevant mobile station 10. A comparison is then made as to whether the value of the second counter 7 exceeds a predetermined reference value (step 37) which is also stored in the reference value memory 5.

If this is not so the process continues with step 38 whereupon the RF link associated with the relevant mobile station 10 is interrupted (step 39). In addition, the subscriber can be correspondingly notified about the reason for the interruption (step 38) before the radio link is interrupted.

If the value of the second counter 7 exceeds the predetermined reference value, the access of the mobile station 10 to the radio network is completely blocked (step 41) since it can be assumed that the power control of the mobile station is defective. First, the mobile station can be notified about the complete block (step 40).

A combination of the two evaluating methods can be useful. The first mentioned method prevents interference by terminals with failed power control whereas the second method described can also recognize the detection of terminals with wrongly implemented RF power control (e.g. control too slow).

KEY TO THE DRAWINGS

1 Base station
2 Transceiver
3 Monitoring unit
4 Logic
5 Reference value memory
6 First counter (Z1)
7 Second counter (Z2)
8 Base station controller
9 Air interface
10 Mobile station
20 Detect received power
21 Compare received power
22 Increment counter Z1
23 Compare counter Z1
24 Notify MS
25 Interrupt connection
30 Detect commands
31 Command for increasing power
32 Set Z1 to zero
33 Command to reduce power
34 Increment counter Z1
35 Compare counter Z1
36 Increment counter Z2
37 Compare counter Z2
38 Notify MS 39 Interrupt connection
40 Notify MS
41 Block MS

What is claimed is:

1. A method for avoiding interference in cellular CDMA radio networks caused by defective terminals, comprising providing at least one counter in a monitoring unit set up so as to be capable of detecting commands for controlling the power of a mobile stations which are sent from a base station to the mobile station individually for each mobile station, and of initiating predetermined follow-up actions in dependence thereon, wherein the base station interrupts an RF link associated with the corresponding mobile station if the value of the counter exceeds a predetermined reference value; providing a second counter for counting individually the connection interruptions initiated for each mobile station; and blocking the access of the mobile station to the radio network completely if the value of the second counter exceeds a predetermined reference value.

2. The method as claimed in claim 1, wherein the counter is incremented by one step with each command of the base station to the mobile station to reduce the transmit power, and is decremented by one step, or reset to zero, with each command to increase the transmit power.

3. The method as claimed in claim 1, wherein the mobile station is notified about the reason for the interruption before the connection is interrupted.

4. The method as claimed in claim 1, wherein notification is in the form of a short SMS message.

5. The method as claimed in claim 1, wherein a separate counter is set up for each existing radio link between the mobile station and the base station.

6. The method as claimed in claim 1, wherein the monitoring unit compares an actual received power arriving from a mobile station with a predetermined nominal received power and initiates predetermined follow-up actions in dependence on the result of the comparison.

7. The method as claimed in claim 6, wherein as follow-up action, the RF link between the base station and mobile station is interrupted if the actual received power exceeds the nominal received power.

8. The method as claimed in claim 6, wherein as follow-up action, the mobile station is blocked for further accesses to the radio network if the actual received power exceeds the nominal received power a number of times in succession.

9. The method as claimed in claim 6, wherein the comparison is in each case carried out during the first uplink connection between the mobile station and a base station of the radio network.

10. The method as claimed in claim 6, wherein before the mobile station is blocked, the subscriber is notified about the reason for the block.

11. The method as claimed in claim 10, wherein the notification is in the form of a short SMS message.

12. The method as claimed in claim 1, wherein the block of the mobile station is linked to its international mobile equipment identity (IMEI).

13. The method as claimed in claim 1, wherein the monitoring unit is set up in the base stations of the radio network.

14. The method as claimed in claim 1, wherein the monitoring unit is set up in the base station controllers of the radio network.

* * * * *